US012805423B2

(12) United States Patent
Tempelmeyer et al.

(10) Patent No.: US 12,805,423 B2
(45) Date of Patent: Nov. 24, 2026

(54) PIVOTING ROBOTIC PLANTER

(71) Applicant: NUtech Ventures, Lincoln, NE (US)

(72) Inventors: Ian Tempelmeyer, Lincoln, NE (US); Roger Hoy, Lincoln, NE (US); Santosh Pitla, Lincoln, NE (US); Paul Jasa, Lincoln, NE (US)

(73) Assignee: NUtech Ventures, Lincoln, NE (US)

(*) Notice: Subject to any disclaimer, the term of this patent is extended or adjusted under 35 U.S.C. 154(b) by 313 days.

(21) Appl. No.: 18/528,552

(22) Filed: Dec. 4, 2023

(65) Prior Publication Data

US 2024/0180064 A1 Jun. 6, 2024

Related U.S. Application Data

(60) Provisional application No. 63/430,286, filed on Dec. 5, 2022.

(51) Int. Cl.
*A01B 79/02* (2006.01)
*A01C 7/08* (2006.01)
*A01C 19/02* (2006.01)

(52) U.S. Cl.
CPC ................ *A01B 79/02* (2013.01); *A01C 7/08* (2013.01); *A01C 19/02* (2013.01)

(58) Field of Classification Search
None
See application file for complete search history.

(56) References Cited

U.S. PATENT DOCUMENTS 9,582,002 B2 2/2017 Cavender-Bares et al.
11,160,214 B2 11/2021 Baker
2018/0338413 A1* 11/2018 Connell ................ A01C 7/208
2018/0354625 A1* 12/2018 Verkade ................ B64C 17/02
2019/0053417 A1* 2/2019 Beaujot ................ A01B 51/02
2022/0015279 A1 1/2022 Green et al.
(Continued)

FOREIGN PATENT DOCUMENTS

CA 3167255 A1 * 8/2021 ............ A01M 21/02

OTHER PUBLICATIONS

Agrointelli, "Robotti," Website, last accessed Dec. 4, 2023, 1 page, https://agrointelli.com/.
(Continued)

*Primary Examiner* — Christopher J Sebesta
*Assistant Examiner* — Alfred H Tsui
(74) *Attorney, Agent, or Firm* — Suiter Swantz IP

(57) ABSTRACT

An implement-operating vehicle is disclosed. The implement-operating vehicle includes a frame, a plurality of ground engagement elements coupled to the frame, and a power source configured to power the ground engagement elements. The implement-operating vehicle further includes an implement platform that includes a rotation bearing. The implement platform is configured to couple to an implement and rotate the implement on an axis perpendicular to the ground. The implement-operating vehicle further includes one or controllers including one or more processors and memory. The one or more processors are instructed to control movement of the ground engagement elements along the ground in a first direction and control operation of the platform motor to rotate the implement to a first position corresponding to the first direction.

18 Claims, 13 Drawing Sheets

(56) References Cited

U.S. PATENT DOCUMENTS

2022/0183265 A1* 6/2022 Kocer ................ A01M 7/0089
2022/0287214 A1 9/2022 Beaujot

OTHER PUBLICATIONS

Murman, “Flex-Ro: A Robotic High Throughput Field Phenotyping System,” Biological Systems Engineering—Dissertations, Theses, and Student Research, Dec. 2019, 153 pages.
Realagriculture, “Dot’s autonomous row-crop planter debuts in Ontario,” Website, Sep. 11, 2019, 1 page, https://www.realagriculture.com/2019/09/dots-autonomous-row-crop-planter-debuts-in-ontario/.
Werner, “Flex-Ro: Design, Implementation, and Control of Subassemblies for an Agricultural Robotic Platform,” Biological Systems Engineering—Dissertations, Theses, and Student Research, Nov. 2016, 162 pages.

* cited by examiner

PIVOTING ROBOTIC PLANTER

CROSS-REFERENCE TO RELATED APPLICATIONS

The present application claims the benefit under 35 U.S.C. § 119(e) of U.S. Provisional Application Ser. No. 63/430,286, filed Dec. 5, 2022, titled PIVOTING ROBOTIC PLANTER, which is hereby incorporated by reference in its entirety.

FEDERALLY SPONSORED RESEARCH OR DEVELOPMENT

This invention was made with government support under 2021-67021-34411 awarded by the National Institute of Food and Agriculture. The government has certain rights in the invention.

TECHNICAL FIELD

The present invention generally relates to mechanically assisted agricultural implements, and, in particular, to robotic planters capable of rotating a planter unit to a position corresponding to any direction of movement taken by the robotic planter.

BACKGROUND

Agriculture is typically a labor-intensive endeavor, and agricultural businesses (e.g., farms) are susceptible to labor shortages. The development and use of agricultural tractors have reduced the dependence on labor. However, current agricultural tractors still require labor for operation.

In row-crop production, the ends of the furrows (e.g., headlands) are utilized by farm equipment for turning equipment around upon each pass along the furrow. The soil at the headlands is often compacted due to the excess driving of vehicles (e.g., tractors and implements) on headland soil. Crops that are planted on the headlands are often adversely affected by the excessive soil compaction, and the crops themselves are often damaged by other tractors and implements (e.g., sprayers or cultivators) that also utilize the headlands for turning around.

Therefore, it would be advantageous to provide systems and methods that overcome the shortcomings described above.

SUMMARY

An implement-operating vehicle is disclosed, in accordance with one or more embodiments of the present disclosure. In one illustrative embodiment, the vehicle includes a frame. In another illustrative embodiment, the vehicle includes a plurality of ground engagement elements coupled to the frame. In another illustrative embodiment, the vehicle includes a power source configured to power the ground engagement elements. In another illustrative embodiment, the vehicle includes an implement platform coupled to the frame, wherein the implement platform comprises a rotation bearing. In another illustrative embodiment, the implement platform is configured to couple to an implement. In another illustrative embodiment, the implement platform is configured to rotate the implement via the rotation bearing on an axis perpendicular to a ground surface. In another illustrative embodiment, the implement operating vehicle includes a platform motor coupled to the rotation bearing providing a force to cause the implement to rotate, wherein the platform is configured to rotate the implement to a first position corresponding to a first direction of movement by the ground engagement elements.

Another implement-operating vehicle is disclosed, in accordance with one or more embodiments of the present disclosure. In one illustrative embodiment, the vehicle includes a frame. In another illustrative embodiment, the vehicle includes a plurality of ground engagement elements coupled to the frame. In another illustrative embodiment, the vehicle includes a power source configured to power the ground engagement elements. In another illustrative embodiment, the vehicle includes an implement platform coupled to the frame, wherein the implement platform comprises a rotation bearing. In another illustrative embodiment, the implement platform is configured to couple to a planter. In another illustrative embodiment, the implement platform is configured to rotate the planter via the rotation bearing on an axis perpendicular to a ground surface. In another illustrative embodiment, the implement-operating vehicle includes a platform motor coupled to the rotation bearing providing a force to cause the planter to rotate. In another illustrative embodiment, the vehicle includes one or more controllers communicatively coupled to the platform motor and the ground engagement elements, the one or more controllers including one or more processors configured to execute a set of program instructions stored in a memory. In another illustrative embodiment, the set of program instructions is configured to cause the one or more processors to control movement of the ground engagement elements along the ground in a first direction. In another illustrative embodiment, the set of program instructions is configured to cause the one or more processors to control operation of the platform motor to rotate the planter to a first position corresponding to the first direction.

A method is disclosed, in accordance with one or more embodiments of the present disclosure. In one illustrative embodiment, the method may include driving an implement-operating vehicle in a first direction in a field toward a first headland and away from a second headland, the implement-operating vehicle coupled to a planter operating in a first planter position along a first furrow, wherein a forward section of the implement-operating vehicle is pointed toward the first headland. In one illustrative embodiment, the method may include arriving at the first headland. In one illustrative embodiment, the method may include raising the planter from an operating position to a travel position. In one illustrative embodiment, the method may include moving the implement-operating vehicle along the first headland so that the planter is in line with a second furrow, while keeping the forward section of the implement-operating vehicle pointed within 90 degrees toward the first headland. In one illustrative embodiment, the method may include rotating the planter on an axis perpendicular to a ground surface to a second planter position. In one illustrative embodiment, the method may include lowering the planter from the travel position to the operating position. In one illustrative embodiment, the method may include driving the implement-operating vehicle in a second direction toward the second headland, wherein the planter is operating in the second planter position along the second furrow wherein an aft section of the implement-operating vehicle is pointed toward the second headland.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

FIGS. 1-8E generally illustrate an implement-operating vehicle (e.g., a tractor) and methods for using the implement-operating vehicle, in accordance with one or more embodiments of the present disclosure.

Embodiments of the present disclosure are directed to an implement-operating vehicle. More particularly, embodiments of the present disclosure are directed to an implement-operating vehicle configured to operate a planting system, such as a planter, for agricultural products. The implement-operating vehicle includes an implement platform that can rotate at least 180 degrees on an axis parallel to the ground and couples at least one type of implement, such as a planter. The implement platform can be controlled so that the implement can be rotated to a position corresponding to a direction of movement taken by the implement-operating vehicle. For example, the implement-operating vehicle may be configured so that when the implement-operative vehicle is operating a one-way type of implement (e.g., a planter) in a field and reaches the end of a field (e.g., a headland), the implement-operating vehicle can move from one furrow (or planned furrow) to the next without having to turn around. Rather, the implement-operating vehicle coordinates a side movement or side shift along with a rotation of the implement platform so that the implement-operating vehicle can plant along the next row (or furrow) in while moving in the opposite direction, all while maintaining the implement (planter) in the correct orientation. The ability of the implement-operating vehicle to move to the adjacent row or furrow without turning completely around (1) reduces the need for a large headland area usually required for vehicles that turn around at the end of a field, (2) reduces the time required for turning around the implement, (3) reduces compaction of headland ground due to less driving on the headland, resulting in increased yields and/or decreased plant damage, and (4) for autonomous or supervised autonomous systems, simplifies the process of turning around an implement in the field.

Figure 1:
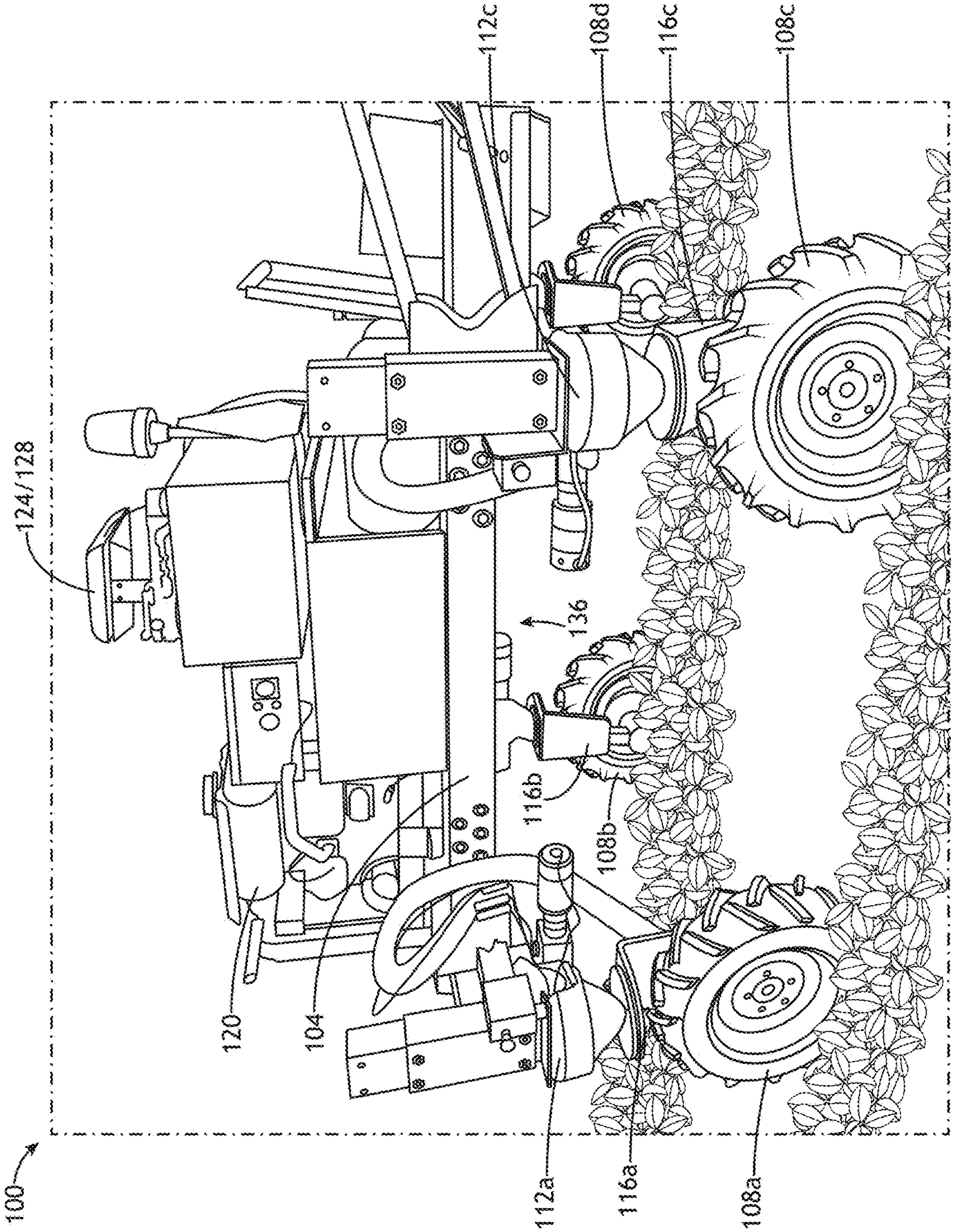
FIG. 1 illustrates a schematic view of an implement-operating vehicle in a field, in accordance with one or more embodiments of the disclosure.

FIG. 1 illustrates a schematic view of an implement-operating vehicle 100, in accordance with one or more embodiments of this disclosure. The implement-operating vehicle 100 may be used in any industry (e.g., farming, construction, logging, manufacturing). For example, the implement-operating vehicle 100 may be utilized in an agricultural setting, such as for performing row crop-related duties (e.g., planting, cultivating, and harvesting). In embodiments, the implement-operating vehicle 100 is supervised autonomous, requiring human intervention only during a portion of the operation of the implement-operating vehicle 100, such as when the implement-operating vehicle 100 is operating/driving between fields, when the implement (such as a planter) on the implement-operating vehicle 100 is rotating to an operating position, or when the implement-operating vehicle 100 is refueling. In embodiments, the implement-operating vehicle 100 operates autonomously (e.g., no need for human intervention in the field, including when maneuvering in a headland from one furrow to another). In embodiments, the implement-operating vehicle is operated manually by an operator.

In embodiments, the implement-operating vehicle 100 includes a frame 104 attached to a plurality of ground engagement elements 108*a-d*. Ground engagement elements 108*a-d* may include any type of vehicle propulsion elements known in the art including, but not limited to, wheels, and tracks (e.g., caterpillar tracks). For example, the ground engagement elements 108*a-d* may include wheels that can rotate in a forward and reverse direction. The implement-operating vehicle may include 2, 3, 4, 6, 8, 9, or 10 or more ground engagement elements 108*a-d*. The frame 104 may be attached to the plurality of ground engagement elements 108*a-d* via an axle and other componentry.

In embodiments, one or more of the ground engagement elements 108*a-d* are steered (e.g., steerable) via a steering subsystem 112*a-d*. The steering subsystem 112*a-d* may be of any steering system type known in the art including, but not limited to, a mechanical steering system (e.g., a slew drive), a hydraulic steering system, or an electrical steering system. In embodiments, the steering subsystems 112*a-d* have a turning range of at least 90 degrees, at least 135 degrees, at least 180 degrees, at least 270 degrees, or 360 degrees. For example, and as shown in FIG. 1, the implement-operating vehicle 100 may include four ground engagement elements 108*a-d*, each having a steering subsystem 112*a-d* capable of turning at least 180 degrees. The one or more ground engagement elements 108*a-d* may also include drive mechanisms 116*a-d* that power the movement (e.g., rotation) of the ground engagement elements 108*a-d*). The drive mechanisms 116*a-d* may be hydraulic (e.g., hydrostatic drive), mechanical (e.g., gear-drive), and/or electrical (e.g., an electric motor drive)

In embodiments, the implement-operating vehicle 100 includes a power source 120 configured to supply power to other components of the implement-operating vehicle 100. The power source may include a combustion engine (e.g., fossil-fuel or hydrogen burning), a battery, or any other type of energy-delivering device.

In embodiments, the implement-operating vehicle 100 includes a vision system 124. The vision system 124 is configured to detect obstacles relative to the vehicle and/or identify a path for the vehicle to follow. The vision system 124 may include a plurality of sensors (e.g., optical cameras, sonar sensor systems, radar sensor systems, lidar sensor systems, or other non-imaging sensors) that are configured to receive input from the surrounding environment. The vision system may include one or more processors that are configured to receive and process the data received by the sensors to extract information about the surrounding environment. In embodiments, the vision system 124 incorporates Global Positioning System/Global Navigation Satellite System (GPS/GNSS) data (e.g., the implement-operating vehicle including a GPS/GNSS receiver). In embodiments, the implement-operating system is guided by received GPS/GNSS data. In embodiments, the implement-operating vehicle 100 includes a GPS receiver and not a vision system 124.

The vision system 124 may further generate via the one or more processors a virtual guide path (e.g., a mapped path to be used as a guide for the autonomous or supervised autonomous implement-operating vehicle 100 to travel). For instance, the virtual guide path may include a path or a segment of a path (e.g., a guide path segment) that will require a steered movement so that the implement-operating vehicle avoids running into an obstacle. In another instance, the virtual guide path may include a path or a segment of a path (e.g., a guide path segment) that follows a furrow or a path next to a furrow. In particular, the virtual guide path may include a segment of a path that follows or runs adjacent to a furrow, wherein a steered movement will need to be made by the implement-operating vehicle 100 to avoid the implement crossing over into a restricted area (e.g., an adjacent furrow).

In embodiments, the implement-operating vehicle 100 includes one or more sensors 128 for sensing one or more plant parameters (e.g., plant phenotyping), soil parameters, or other environmental parameters. The one or more sensors 128 may include, but are not limited to, spectrographic sensors, ultrasonic sensors, cameras, and infrared radiometers.

In embodiments, the implement-operating vehicle 100 includes an implement platform 132 coupled to the frame 104. The implement platform 132 is configured to couple to an implement or an implement subframe. In embodiments, the implement platform 132 is configured to rotate on an axis perpendicular to the ground, enabling the implement to rotate to a working position relative that corresponds to a heading or direction of movement of the implement-operating vehicle 100.

Figure 2:
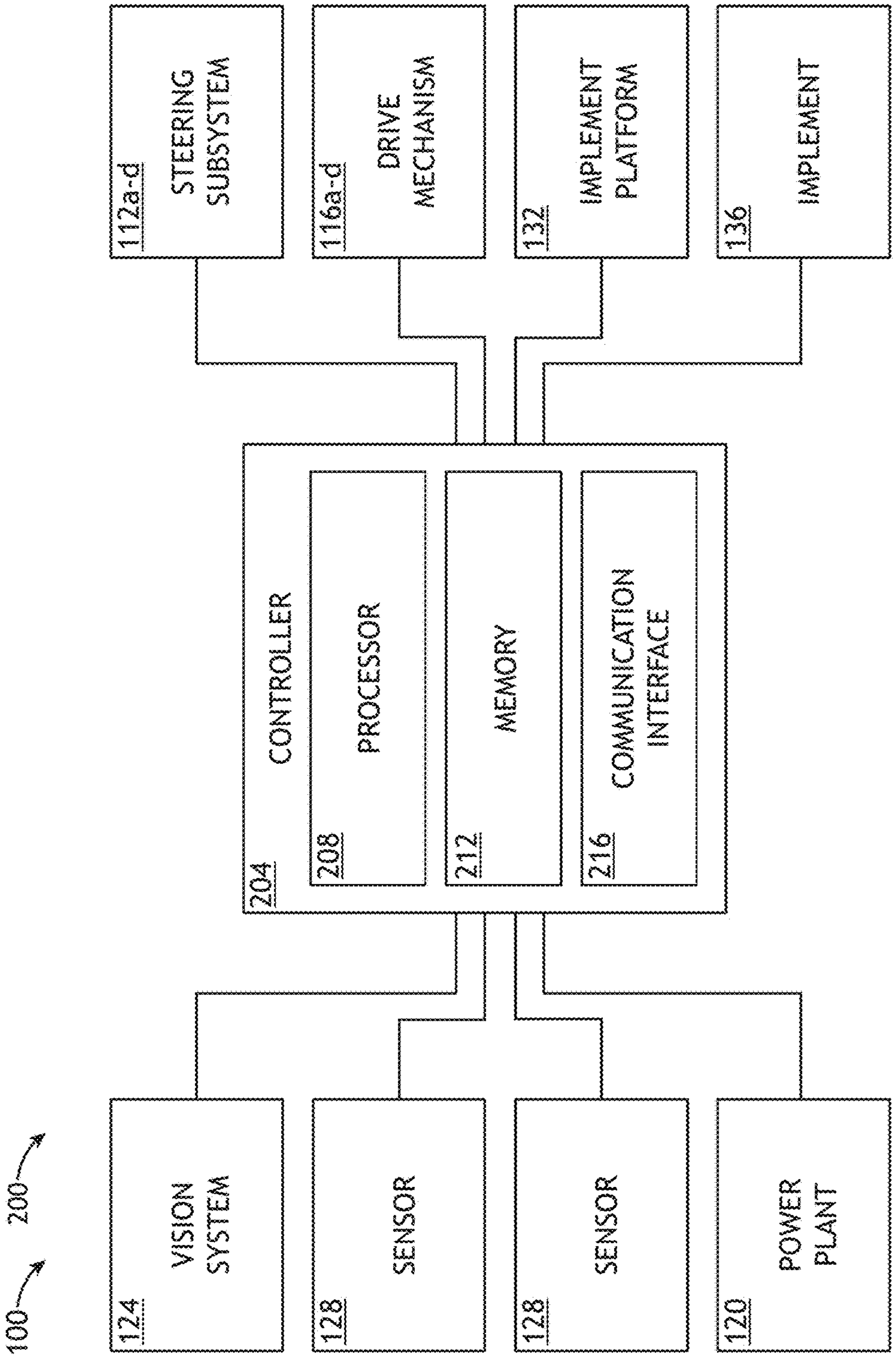
FIG. 2 illustrates a block diagram illustrating the control aspects of the implement-operating vehicle, in accordance with one or more embodiments of the disclosure.

FIG. 2 illustrates a block diagram 200 illustrating the control aspects of the implement-operating vehicle 100, in accordance with one or more embodiments of the disclosure. For example, the implement-operating vehicle 100 may include one or more controllers 204 in communication with (e.g., communicatively coupled at any given time to) the steering subsystem 120*a-d*, the drive mechanism 116*a-d*, the power source 120, the vision system 124, the one or more sensors 128, and the implement platform 132. The controller 204 may also be in communication with one or more implements 136 coupled to the implement-operating vehicle 100. Communication of the steering subsystem 120*a-d*, the drive mechanism 116*a-d*, the power source 120, the vision system 124, the one or more sensors 128, the implement platform 132, and the one or more implements 136 may be implemented via wireless or wireline technology. The controller 116 provides processing functionality for one or more components of the implement-operating vehicle 100.

In embodiments, the controller 204 includes at least one processor 208, memory 212, and communication interface 216. The at least one processor 208 may be implemented as any suitable processor(s), such as at least one general purpose processor, at least one central processing unit (CPU), at least one image processor, at least one graphics processing unit (GPU), at least one field-programmable gate array (FPGA), and/or at least one special purpose processor configured to execute instructions for performing (e.g., collectively performing if more than one processor) any or all of the operations disclosed throughout. The at least one processor 208 may be configured to execute a set of program instructions stored in a memory 212. In embodiments, the controller 204 is a processor 208.

The communication interface 216 can be configured to communicate with components of the implement-operating vehicle 100. For example, the communication interface 160 can be configured to retrieve data from the controller 204 or other components, transmit data for storage in the memory 212, retrieve data from storage in the memory 212, and so forth. The communication interface 160 can also be communicatively coupled with the controller 204 to facilitate data transfer between components of the implement-operating vehicle 100 and the components outside of the implement-operating vehicle 100 (e.g., a data collection device, such as a laptop or tablet). It should be noted that while the communication interface 160 is described as a component of the implement-operating vehicle 100, one or more components of the communication interface 160 can be implemented as external components communicatively coupled to the implement-operating vehicle 100 via a wired and/or wireless connection. The communication interface 160 can also include and/or connect to one or more input/output (I/O) devices. In embodiments, the communication interface 160 includes or is coupled to a transmitter, receiver, transceiver, physical connection interface, or any combination thereof.

As used throughout and as would be appreciated by those skilled in the art, "at least one non-transitory computer-readable medium", or memory 212, may refer to as at least one non-transitory computer-readable medium (e.g., e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used herein, an implement 136 refers to any tool or device used for a particular purpose than can be coupled to the frame. For example, an implement 136 may include any agricultural implement including, but not limited to, a planter, a cultivator, a sprayer, a harvester, a harrow, a fertilizer spreader, a rake, a post-hole digger (e.g., a drill), a bailer (e.g., hay bailer), a plow, a mower, an irrigation system (e.g., sprinklers, center pivots), or other agricultural implements. In another example, the implement 136 may include any construction implement, including but not limited to, an excavator, a loader, a backhoe, a forklift, a crane, a scraper, a cement mixer, a saw, a jackhammer, or a grader. In another example, the implement 136 may include any forestry implement including, but not limited to, a log splitter, a forest grinder, a feller buncher, or a forwarder). In another example, the implement 136 may include any manufacturing implement, including but not limited to, a mixer or a conveyer belt.

Figure 3:
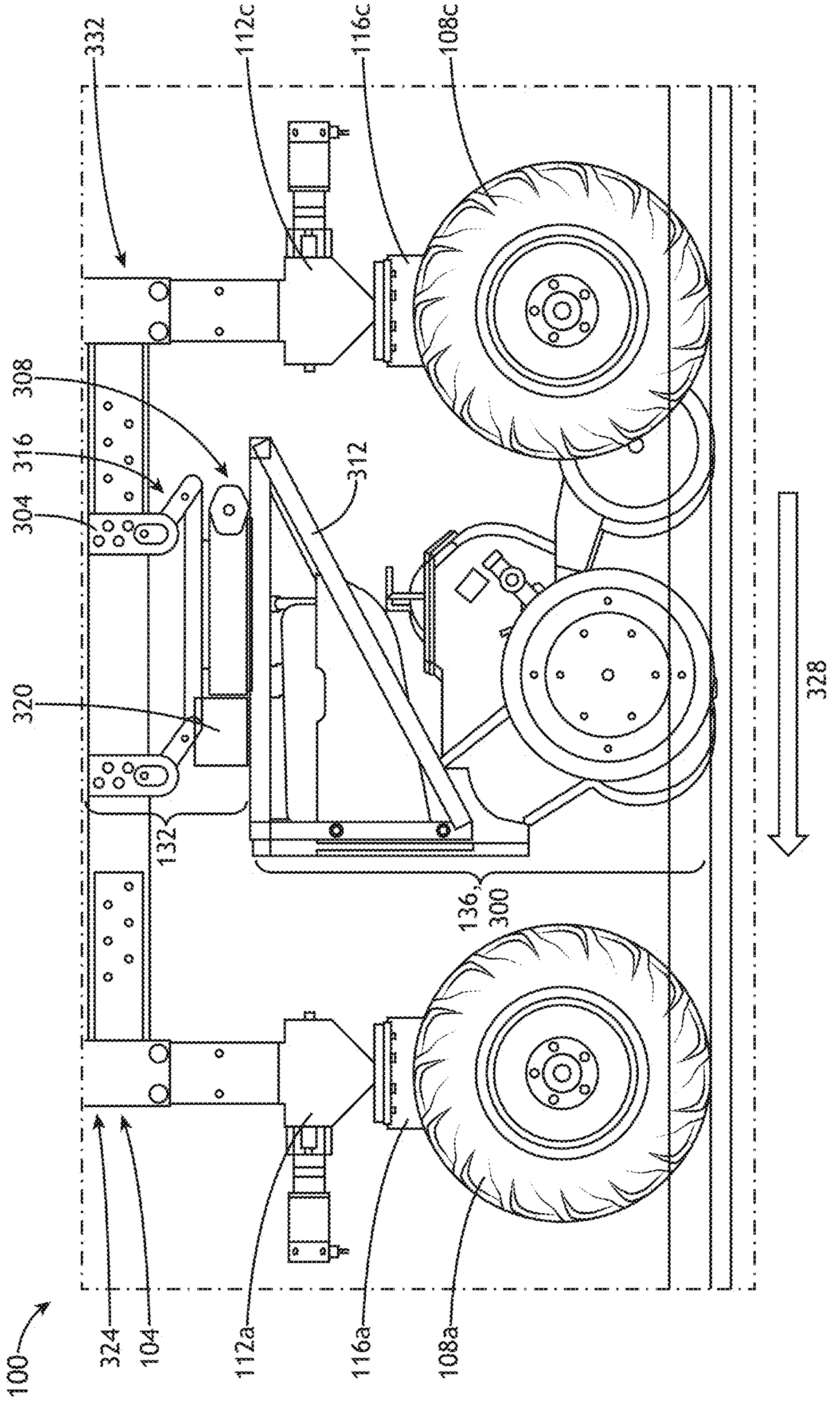
FIG. 3 illustrates a side view of a lower section of the implement-operating vehicle, in accordance with one or more embodiments of the disclosure.

As shown in FIG. 3, an implement 136 (e.g., a planter 300) is coupled to the frame 104 via the implement platform 132. The implement platform 132 includes a frame brace 304 that couples the implement platform 132 to the frame 104. The implement platform further includes a rotation bearing 308 that attaches to the implement 136, 300 or an implement attachment frame 312. The rotation bearing 308 is linked to the frame brace via a linkage 316. In this manner, the rotation bearing 308 is coupled to the implement platform and is configured to couple to an implement 136, 300. The rotation bearing 308 allows the implement 136, 300 to rotate on an axis perpendicular to the ground, while the linkage 316 enables the implement platform 132 to adjust the height of the implement 136, 300 relative to a ground surface.

In embodiments, the implement platform 132 includes a platform motor 320 communicatively coupled to the controller and coupled to the rotation bearing 308. In operation, the platform motor 320 causes an implement 136, 300 coupled to the rotation bearing 308 to rotate (e.g., rotate along an axis perpendicular to the ground). This rotation of the implement 136, 300 provides, along with the steering of the ground engagement elements 108*a-d* provide additional degrees of freedom that permit or enable the implement-operating vehicle 100 to operate the implement 136, 300, in orientations and directions not possible with traditional equipment (e.g., tractors) that operate implements with fewer degrees of freedom. The platform motor 320 may include any type of motor including, but not limited to, mechanical motors (e.g., slew drives), hydraulic motors, or electrical motors.

When integrated with the rotation bearing, the platform motor 320 may cause an implement coupled to the implement platform 132 to have a turning range of at least 90 degrees, at least 135 degrees, at least 180 degrees, at least 270 degrees, 360 degrees, or more than 360 degrees (e.g., greater than one full rotation). For example, the platform motor 320 may position the implement 136, 300 into a first position (e.g., a forward position) that is aligned with a forward section 324 of the frame 104. In the first position, the implement 136, 300 is operational (e.g., functional) as the implement-operating vehicle 100 is moving in a forward direction 328. The platform motor 320 may then rotate the implement 136, 300 180 degrees into a second position (e.g., reverse position) that is aligned with the aft section 332 of the frame 104. In the second position, the implement 136, 300 is not operational when the implement-operating vehicle 100 is moving in the forward direction 328 but is functional when the implement-operating vehicle 100 is moving in the aft or reverse direction, as shown herein. In embodiments, the implement is not operable when the implement platform 132 is rotated in a direction not corresponding to the direction of movement of the ground engagement elements 108*a-d* along the ground.

In embodiments, and as shown in FIG. 3, the implement 136, 300 is placed between the aft section 332 and the forward section 324 of the frame. For example, the implement 136, 300 may be placed between the ground engagement elements 108*a*, 108*b* positioned near the aft section 332 (e.g., aft ground engagement elements), and the ground engagement elements 108*c*, 108*d* positioned near the forward section 332 (e.g., forward ground engagement elements).

Figure 4:
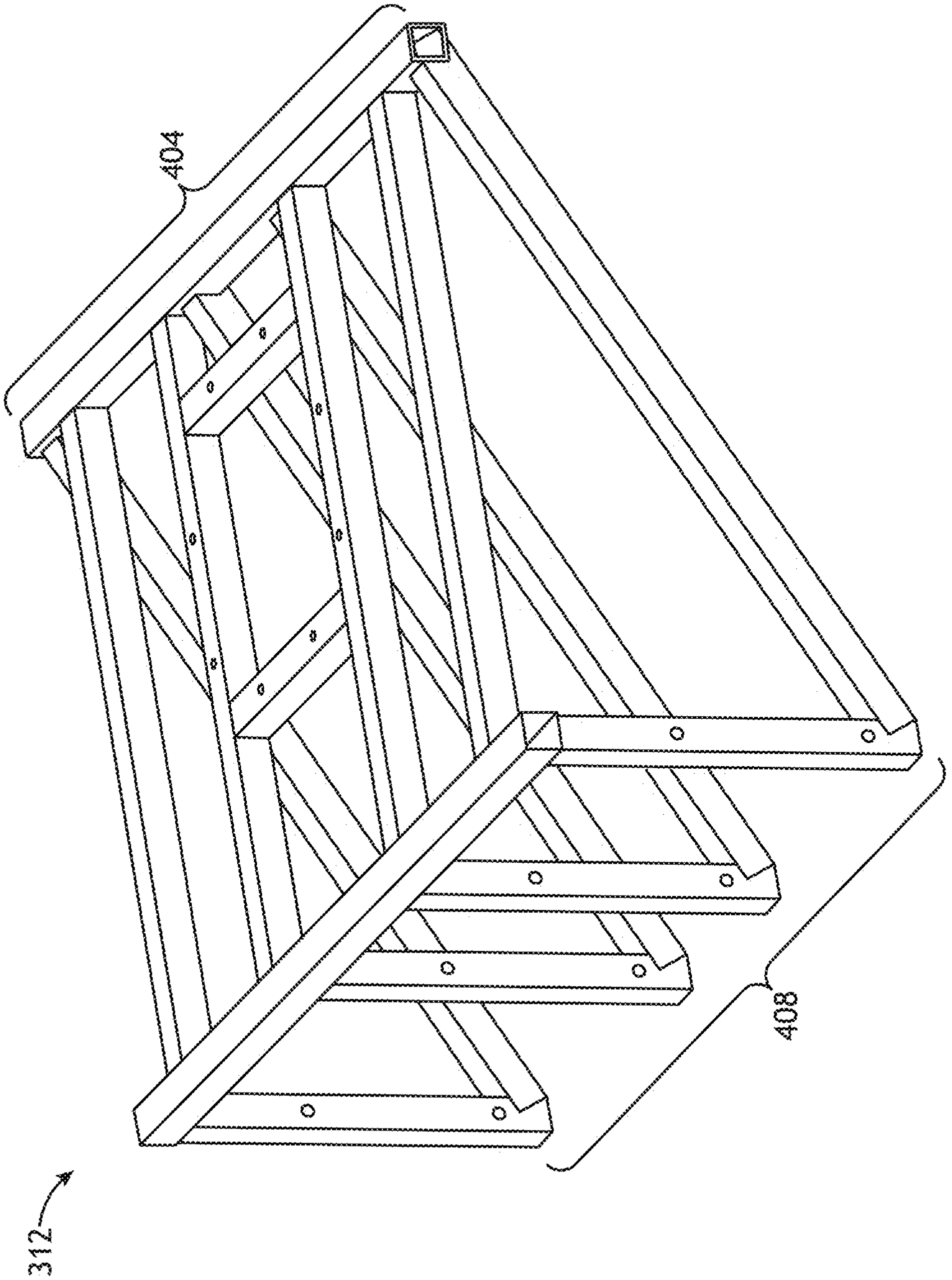
FIG. 4 illustrates a perspective view of an implement attachment frame, in accordance with one or more embodiments of the disclosure.

The implement attachment frame 312 is shown in larger detail in FIG. 4. The implement attachment frame 312 includes a bearing mount area 404 for mounting to the rotation bearing 308, and an implement mount area 408 for mounting to the implement 136, 300. The implement attachment frame may include any type or design that enables the attachment of an implement 136, 300 to the frame 104 and/or linkage 316. Therefore, the design of the implement attachment frame 312 is not limited to the demonstrated embodiments. Greater detail of the coupling between the implement attachment frame 312, the rotation bearing 308 (including a bearing housing, and the linkage 316 is shown in FIG. 5.

Figure 5:
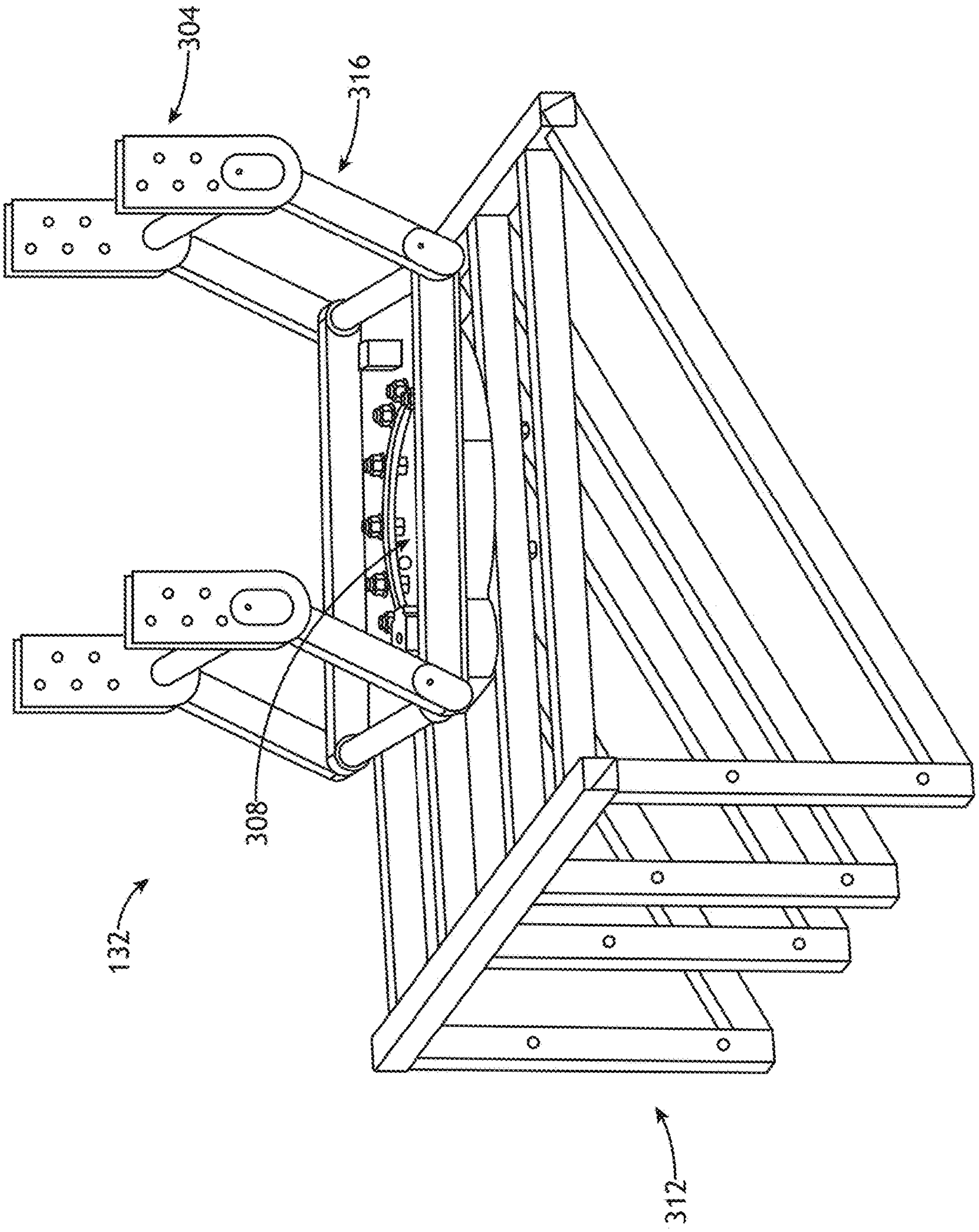
FIG. 5 illustrates a perspective view of an implement attachment frame coupled to a linkage, in accordance with one or more embodiments of the disclosure.
Figure 6A:
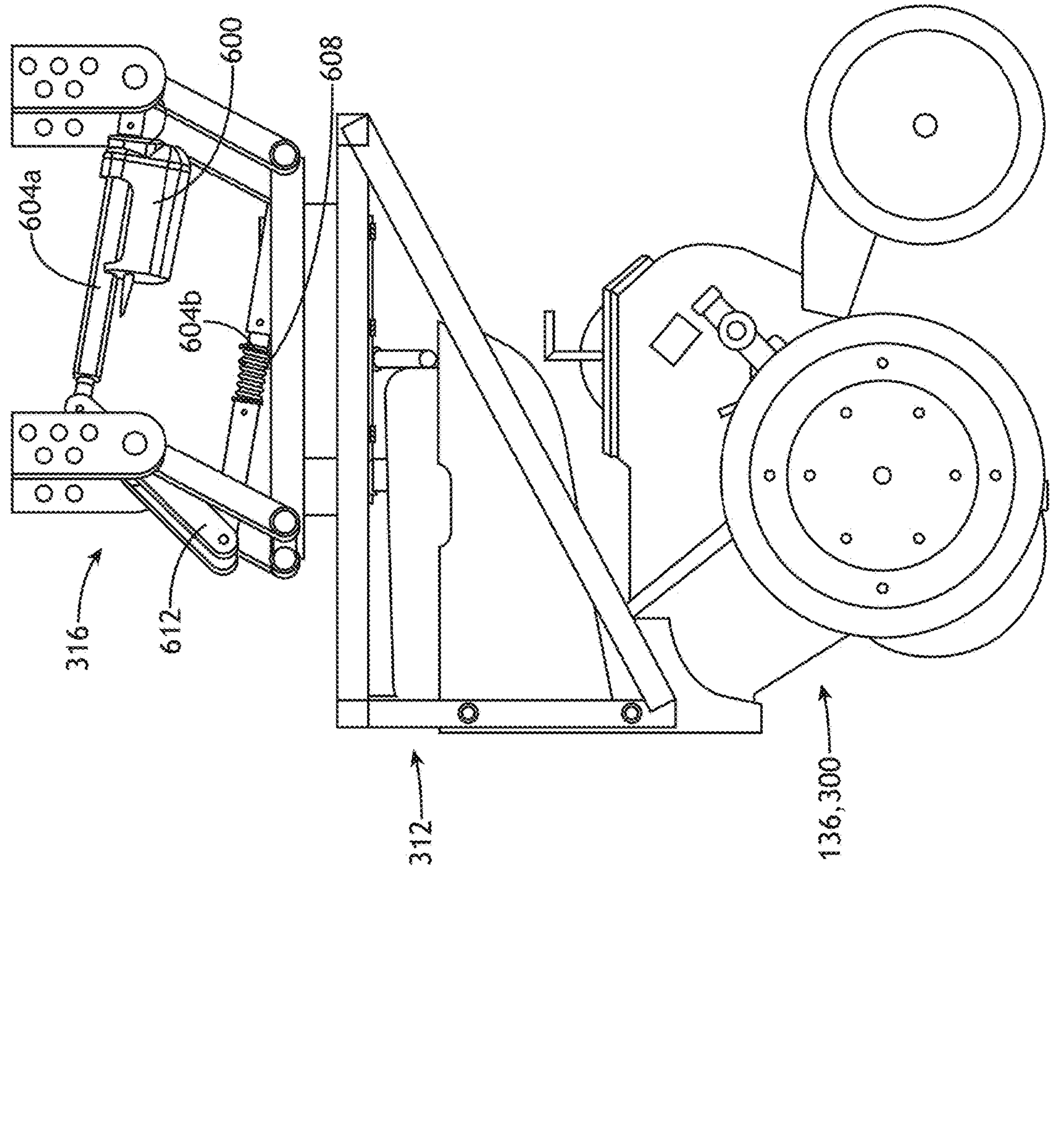
FIG. 6A illustrates a perspective view of linkage coupled to a planter via an implement attachment frame, in accordance with one or more embodiments of the disclosure.

The linkage 316 may be of any type or kind of structural linkage, including but not limited to, a four-bar linkage, as shown in FIG. 5 and FIG. 6A. The linkage 316 may include one or more actuators 600 (e.g., mechanical, electrical, or hydraulic actuator) that lengthens or shortens one or more the bars 604*a* of the linkage 316 enabling the linkage 316 to raise or lower the height of the implement 136, 300. The linkage 316 may include one more adjustment points 608 (e.g., an expansion coupling) that enables one or more bars 604*b* to be lengthened or shortened either automatically or manually. In embodiments, the linkage includes extra bars and joints, such as a drive bar 612 or drive mechanism is directly coupled to the actuated bar 604, enabling movement of the four-bar linkage while reducing stress on the joints of the four-bar linkage.

Figure 6B:
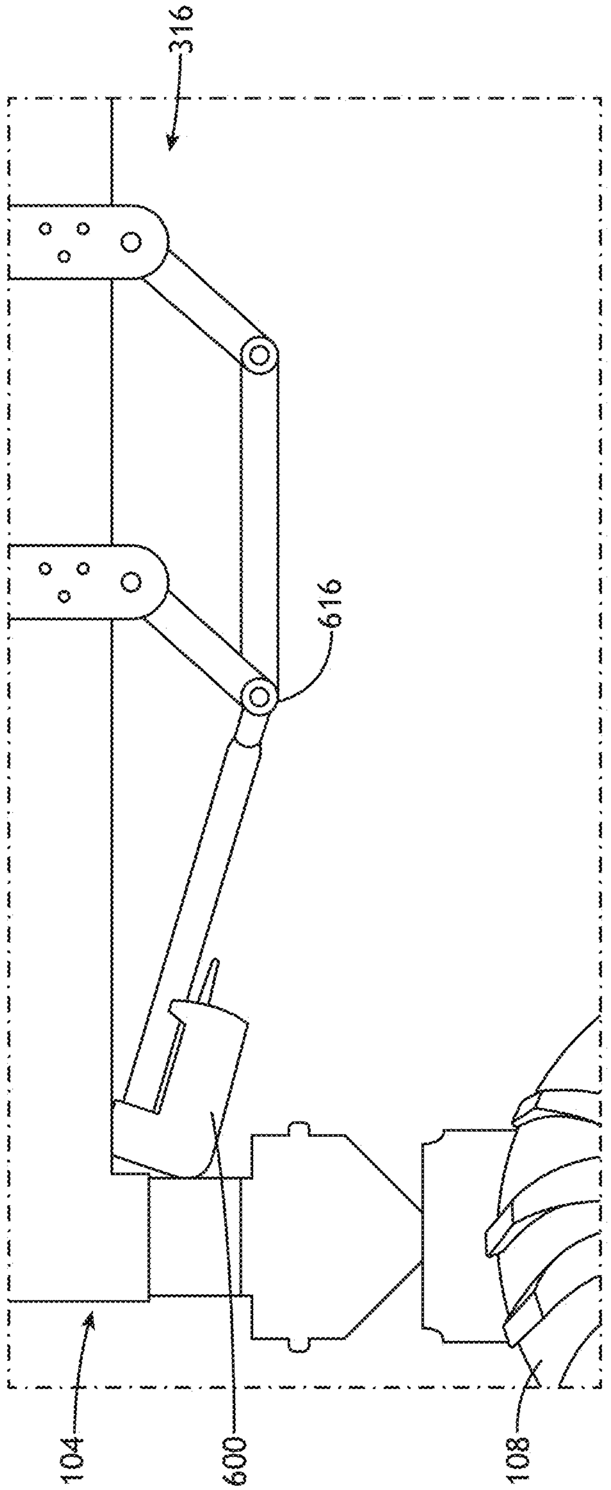
FIG. 6B illustrates a side view of a linkage attached to the frame of the implement-operating vehicle, the linkage including an actuator, in accordance with one or more embodiments of the disclosure.

FIG. 6B illustrates a side view of a linkage (e.g., a four-bar linkage) attached to the frame 104 of the implement-operating vehicle 100. The linkage includes an actuator 600 (e.g., a lift mechanism) coupled to the frame 104 and a joint 616 of the linkage 316. The actuator 600 provides the force needed to lift and lower the implement 136, 300 via the linkage as well as to provide enough downforce so that the implement 136, 300 makes proper contact with the ground, such as when planting using the planter 300. In embodiments, the lift mechanism is configured to deliver a downforce of at least 250 pound-force foot (lb·ft), at least 500 lb·ft, at least 750 lb·ft, or at least 1000 lb-ft. In embodiments, the lift mechanism includes both the linkage 316 and the actuator 600.

Figure 7:
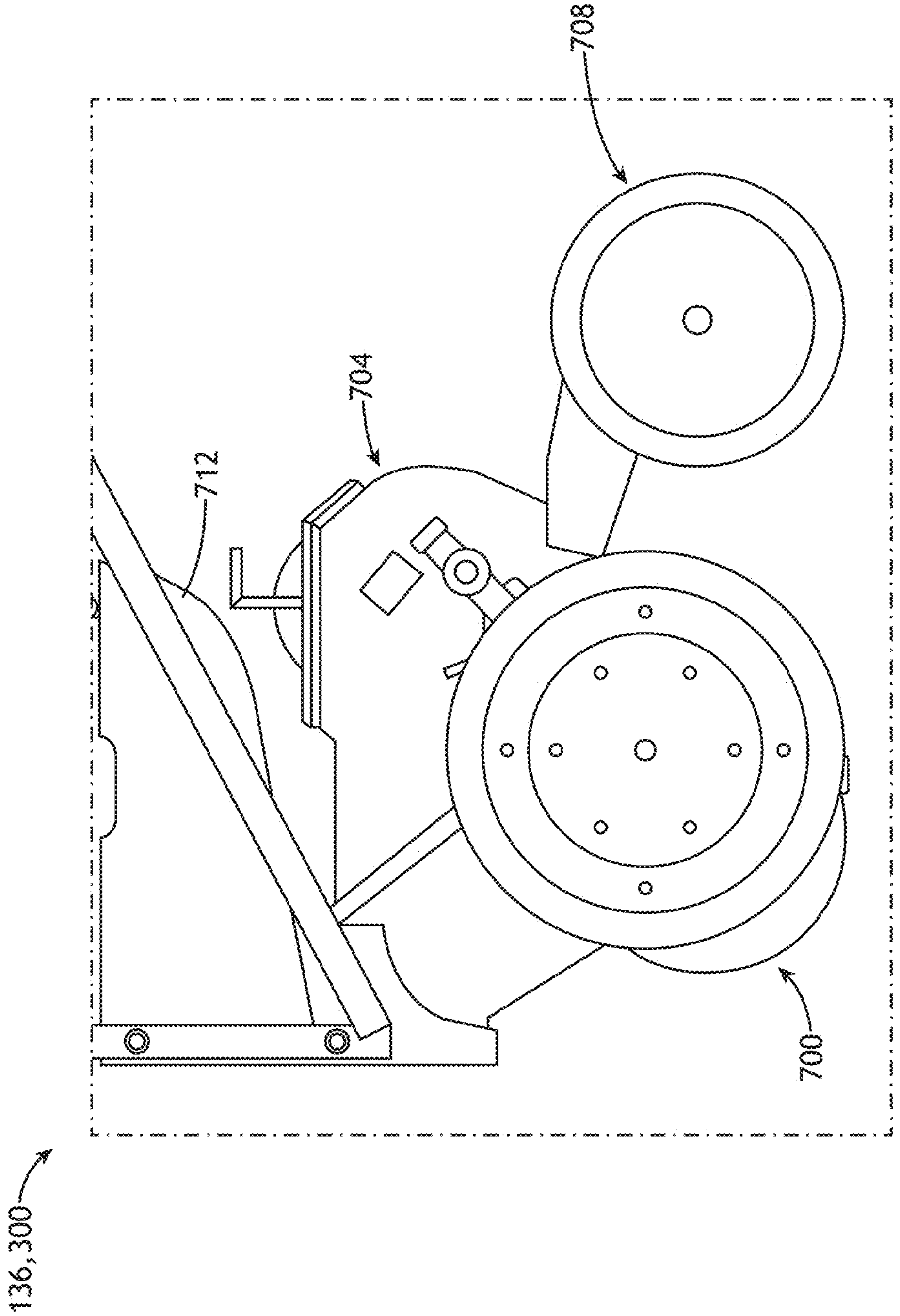
FIG. 7 illustrates a side view of a planter, in accordance with one or more embodiments of the disclosure.

As illustrated in FIG. 7, the planter 300 may include gauge wheels 700, seed meter 704, press wheels 708, and a seed conduit 712 that enables seed to transfer from a seed hopper to the seed meter 704. In embodiments, the planter includes a seed hopper (not shown).

Embodiments of the present disclosure are also directed to a method 800 and environment 850 (e.g., a field) for operating the implement-operating vehicle 100 in a field, as illustrated in FIGS. 8A-E. In embodiments, the method 800 includes a first step 804 of driving an implement-operating vehicle 100 in a first direction 328 in a field toward a first headland 854 and away from a second headland 870, the implement-operating vehicle 100 coupled to a planter 300 operating in a first planter position 858, along a first furrow (furrows 2 and 3 in FIG. 8B), wherein a forward section 324 of the implement-operating vehicle is pointed toward the first headland 854. Step 804 is illustrated in the left half of FIG. 8B, with the implement-operating vehicle 100 moving toward the first headland 854 from the field while straddling furrows 2 and 3. The planter 300 faces the same direction as the direction of the implement-operating vehicle 100.

In embodiments, the method 800 includes a step 808 of arriving at the headland 854. Step 808 is illustrated in the right half of FIG. 8B, with the implement-operating vehicle 100 positioned entirely within the headland 854 and the forward section 324 still facing the same direction.

In embodiments, the method 800 includes a step 812 of raising the planter 300 from an operating position (e.g., a position where the planter may actively plant seeds) to a travel position (e.g., a position where the planter is not touching the ground). For example, the planter 300, or other implement 136, may be raised via the actuator 600 (e.g., such as a linear actuator) and the linkage 316 (e.g., the lift mechanism).

Figure 8A:
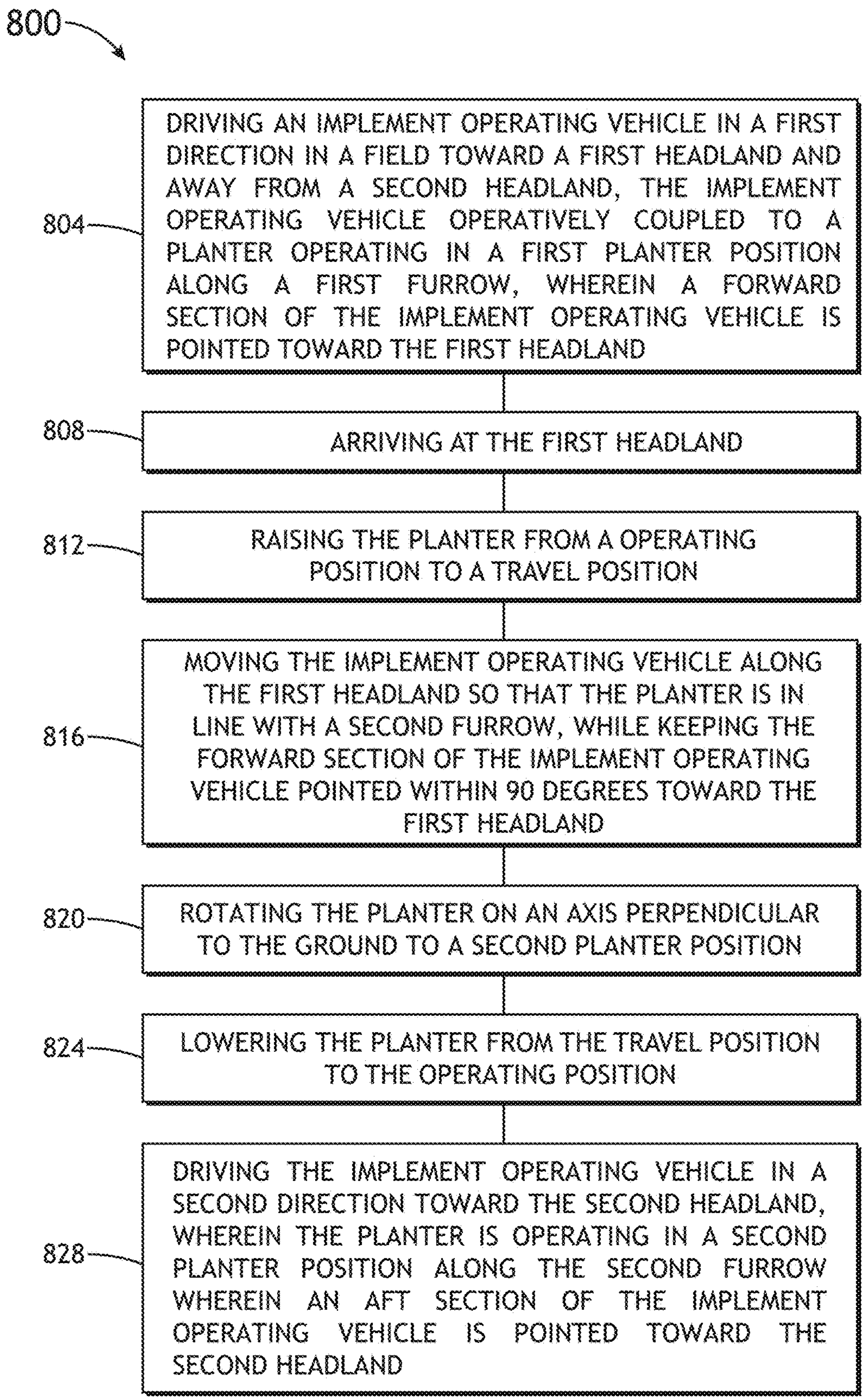
FIG. 8A illustrates a block diagram of a method for operating an implement-operating vehicle, in accordance with one or more embodiments of the disclosure.
Figure 8B:
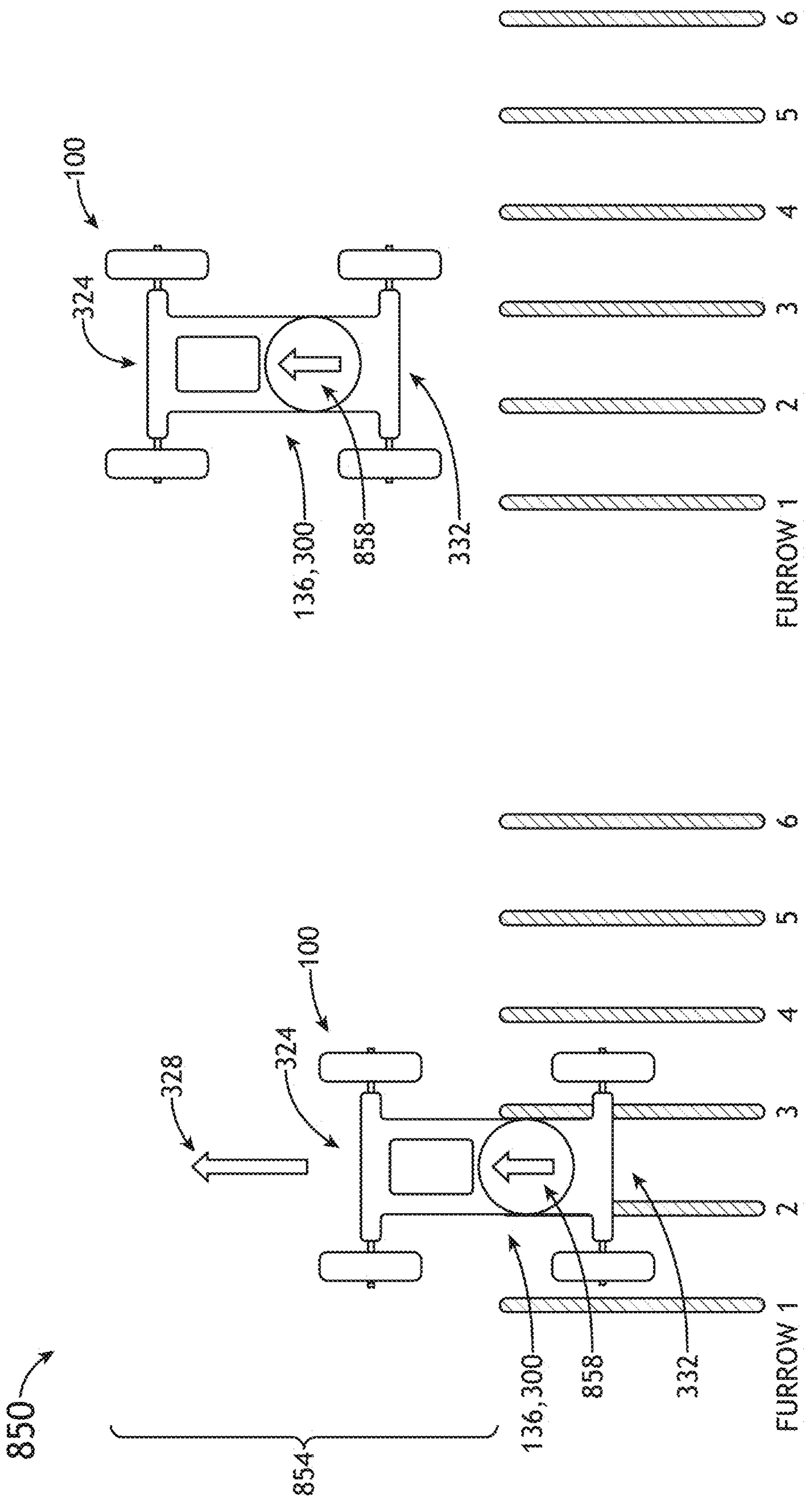
FIGS. 8B-8E illustrates conceptual views depicting a method of operating an implement-operating vehicle, in accordance with one or more embodiments of the disclosure.
Figure 8C:
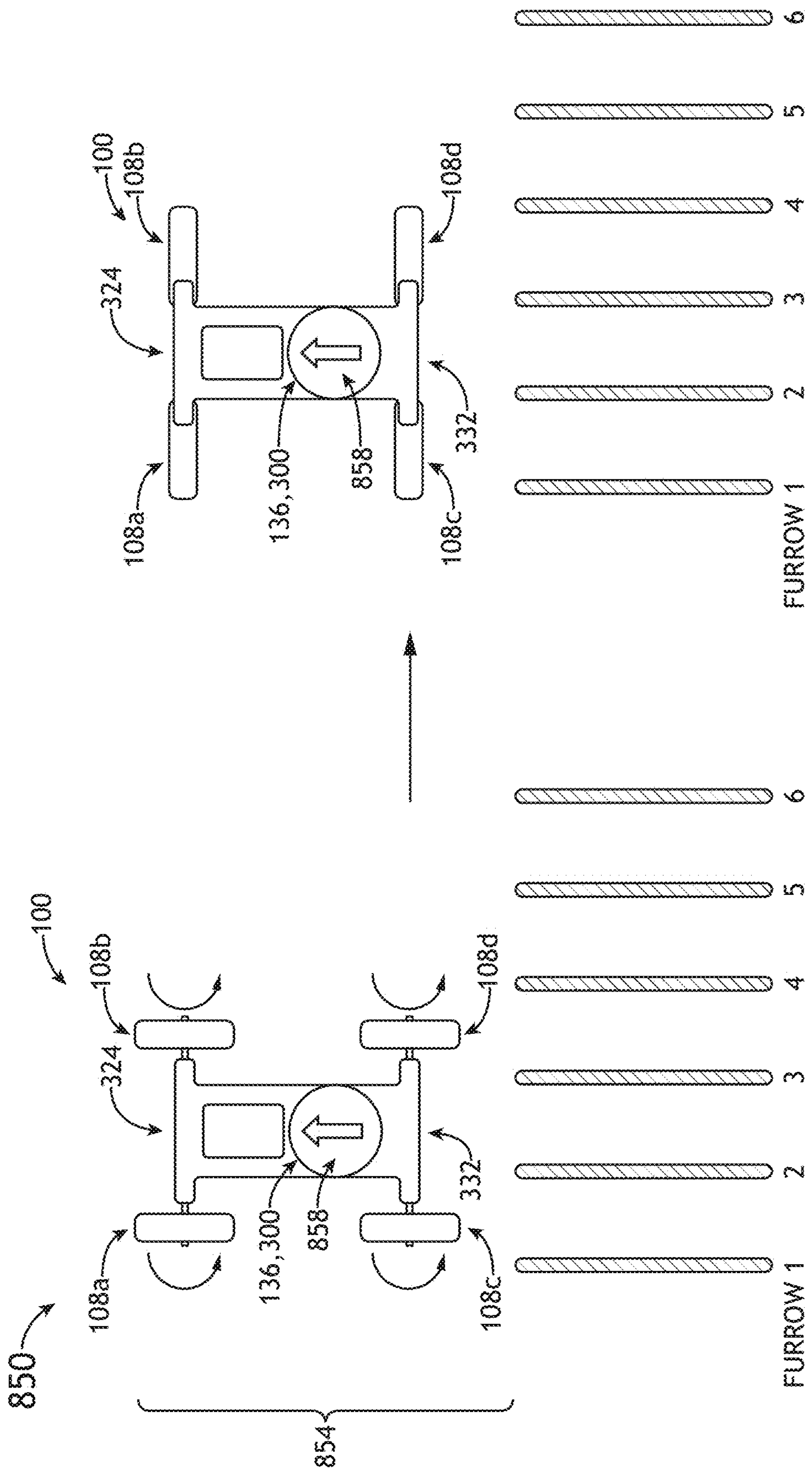
Figure 8D:
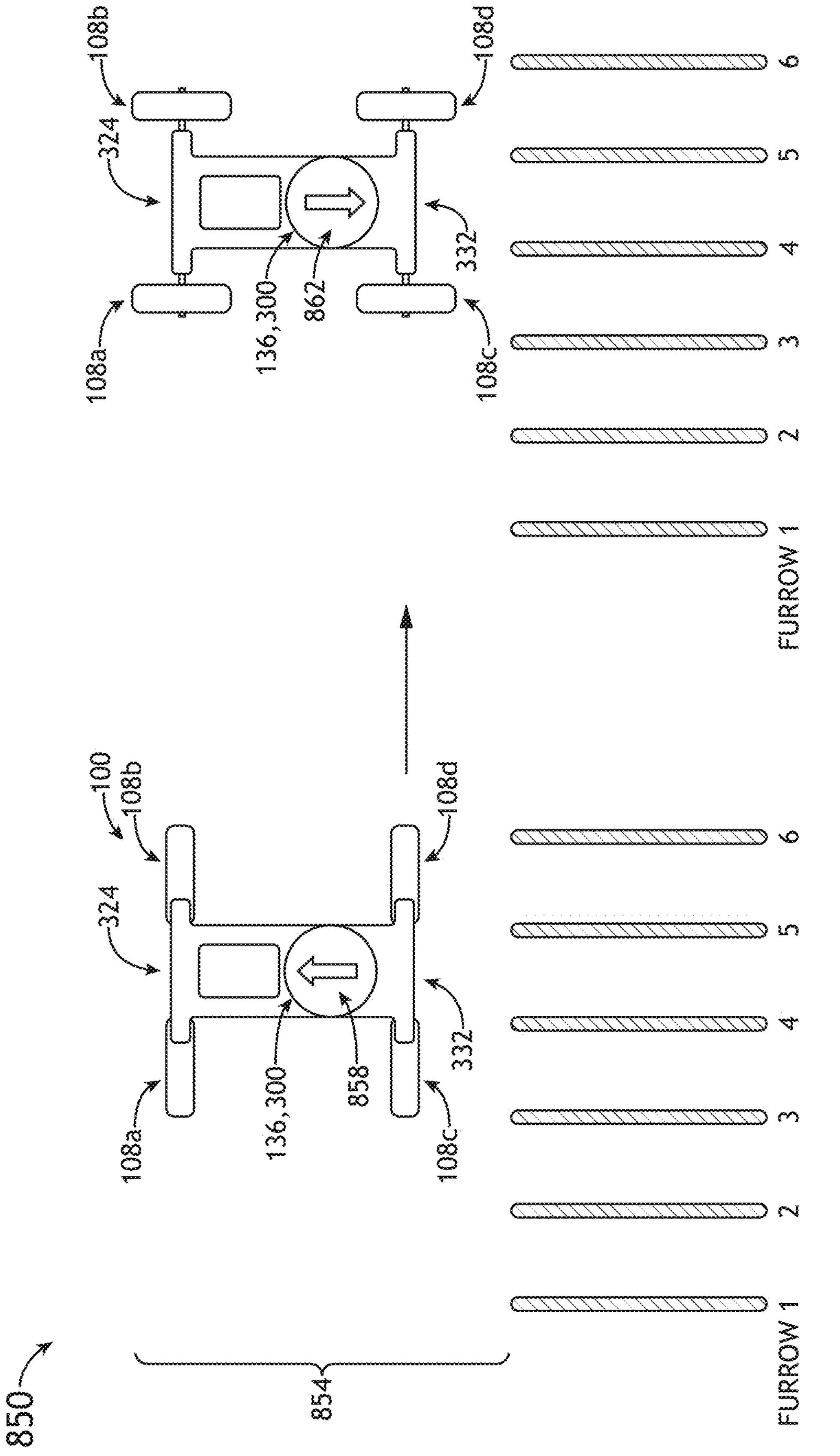
Figure 8E:
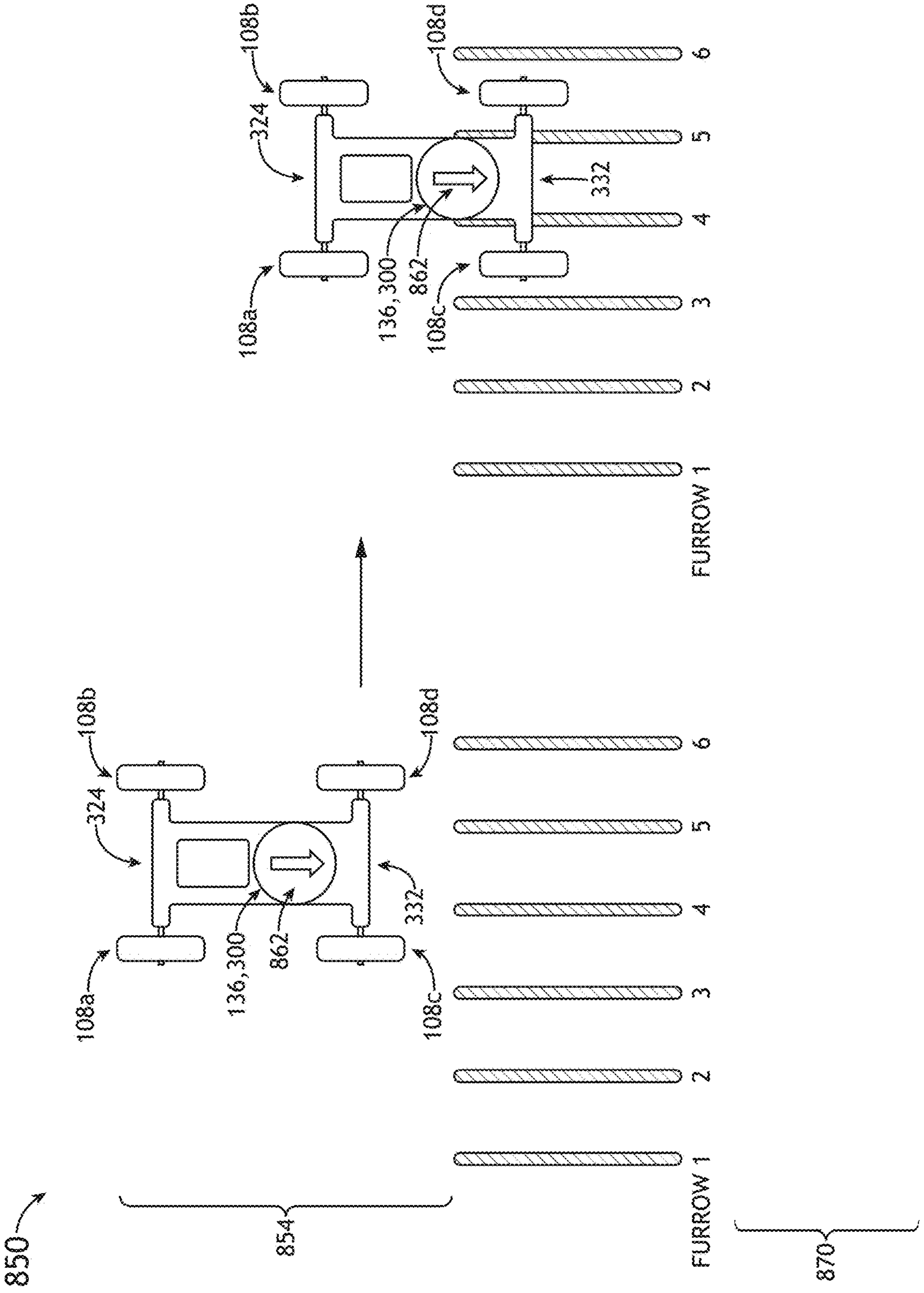

In embodiments, the method 800 includes a step 816 of moving the implement-operating vehicle 100 along the first headland 854 so that the planter 300 is in line with a second furrow (e.g., furrows 4 and 5 as shown in FIG. 8D) to a position adjacent to and parallel to the first furrow while keeping the forward section 324 of the implement-operating vehicle 100 pointed within 90 degrees toward the headland 854. Step 812 is illustrated in FIGS. 8C and 8D. As shown in FIG. 8C each of the ground engagement elements 108*a-d* are rotated 90 degrees while the implement-operating vehicle 100 is straddling furrows 2 and 3. This rotation enables the implement-operating vehicle 100 to slide or slide shift from a position that straddles furrows 2 and 3, as shown in FIG. 8C, to a position that straddles furrows 4 and 5, as shown in FIG. 8D. Once the implement-operating vehicle 100 reaches the position of straddling furrows 4 and 5, the ground engagement elements 108*a-d* are rotated back into a position that enables the implement-operating vehicle 100 to travel down the furrow. The ability of the implement-operating vehicle 100 to side shift from straddling furrows 2 and 3 to straddling furrows 4 and 5 also enables the implement-operating vehicle to drive the ground engagement elements 108*a-d* between furrows that have been planted in the headlands perpendicular to furrows 2, 3, 4, and 5, reducing crop damage of crops in the perpendicular furrows being run over by the ground engagement elements 108*a-d*.

In embodiments, the method includes a step 820 of rotating the planter 300 on an axis perpendicular to the ground to a second planter position 862. As shown in FIG. 8D, the planter 300 is rotated from the first planter position 858 to the second planter position 862 while forward section 324 of the implement-operating vehicle 100 is still facing the headland 854. The rotation of the planter 300 can occur anytime during the travel of the implement-operating vehicle from one furrow to another as long as the implement is in the travel position.

In embodiments, the method 800 includes a step 824 of lowering the planter from the travel position to the operating position. This step 824 may utilize the same actuator 600 and the linkage 316 of step 812.

In embodiments, the method 800 includes a step 828 of driving the implement-operating vehicle 100 in a second direction 866 in the field toward a second headland 870, wherein the planter 300 is operating in a second planter position along the second furrow (furrows 4 and 5 in FIG. 8E) (e.g., parallel to the first furrow), wherein an aft section 332 of the implement-operating vehicle is pointed toward the second headland 870. In this manner, the frame 104 of the implement-operating vehicle 100 does not "turn around" when traveling from one furrow to another, but rather "slides" to another furrow. This sliding action reduces the headland space needed at the end of furrows for turning equipment around, which reduces crop losses due to plant trauma and/or soil compaction. The action of sliding also reduces the complexity of a turning maneuver, particularly when working with large/long equipment. Also, when working in wet or sandy fields, the implement-operating vehicle 100 does not have to contend with wheel slippage that often accompanies tractors when turning around at headlands.

In embodiments, the implement-operating vehicle 100 may be designed to operate any number of implements 136, 300, and any implement 136, 300 may be designed for working within any number of furrows or rows for row crop farming. For example, the implement-operating vehicle 100 may be designed to attach to and operate two single-row planters (e.g., as shown in FIGS. 8B-8E). In another example, the implement-operating vehicle 100 may be designed to attach to and operate one dual-row (two-row) planter. The implement-operating vehicle 100 may be designed to attach to and operate 1, 2, 3, 4, 6, 8, 10, or more planters (organized as single or multiple planter units). As shown in FIGS. 8B-8E, the implement 136, 300 may have a diameter such that the implement 136, 300 can rotate without hitting the ground engagement elements 108*a-d* (e.g., a rotation diameter of the implement 136, 300 is smaller than the wheelbase and/or track of the implement-operating vehicle 100. However, the implement-operating vehicle 100 may be configured to operate and rotate implements 136, 300 that have a rotation diameter larger than the wheelbase and/or track of the implement-operating vehicle. For example, the implement-operating vehicle 100 may include leg-lifts that enable individual ground engagement elements 108*a-d* to step over the implement 136, 300 as the implement 136, 300 rotates.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order and are not necessarily meant to be limited to the specific order or hierarchy presented It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in another embodiment, one or more of the steps may be carried out as two or more sub-steps. Further, other steps or sub-steps may be carried in addition to, or as substitutes to one or more of the steps disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present), and B is false (or not present), A is false (or not present), and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

What is claimed:

1. An implement-operating vehicle comprising:

a frame;

a plurality of ground engagement elements coupled to the frame;

a power source configured to power the ground engagement elements;

an implement platform coupled to the frame, wherein the implement platform comprises a rotation bearing, the implement platform configured to:

couple to an implement; and rotate the implement at least 180 degrees via the rotation bearing on an axis perpendicular to a ground surface; and a platform motor coupled to the rotation bearing providing a force to cause the implement to rotate, wherein the platform is configured to rotate the implement to a first position corresponding to a first direction of movement by the ground engagement elements, wherein the plurality of ground engagement elements comprises a set of forward drive ground engagement elements and a set of aft drive ground engagement elements, wherein the implement platform is coupled to the frame at a position between the set of forward drive ground engagement elements and the set of aft drive ground engagement elements, wherein the implement is restricted to a position between the set of forward drive ground engagement elements and the set of aft drive ground engagement elements such that rotating the implement 180 degrees does not cause the implement to contact any of the plurality of ground engagement elements.

2. The implement-operating vehicle of claim 1, further comprising one or more controllers communicatively coupled to the platform motor and the ground engagement elements, the one or more controllers including one or more processors configured to execute a set of program instructions stored in a memory, the set of program instructions configured to cause the one or more processors to:

control movement of the ground engagement elements along the ground in the first direction; and control operation of the platform motor to rotate the implement to the first position.

3. The implement-operating vehicle of claim 1, further including a lift mechanism coupled to the implement platform configured to adjust a height of the implement relative to the ground surface.

4. The implement-operating vehicle of claim 2, further including a vision system including one or more sensors communicatively connected to the one or more controllers, wherein the set of program instructions are further configured to cause the one or more processors to generate a virtual guide path based on data received from the vision system, wherein the virtual guide path includes at least one of:

a guide path segment that requires a steered movement to avoid an obstacle detected by the vision system, or a guide path segment that requires a steered movement to avoid a movement of the implement into a restricted area.

5. The implement-operating vehicle of claim 1, further including the implement.

6. The implement-operating vehicle of claim 5, wherein the implement is configured to couple to the implement platform via an implement subframe.

7. The implement-operating vehicle of claim 1, wherein the implement comprises at least one of a planter, a cultivator, a bailer, a plow, or a harvester.

8. The implement-operating vehicle of claim 1, wherein the implement comprises at least one of a sprayer, a mower, a fertilizer spreader, a harrow, a rake, or an irrigation system.

9. The implement-operating vehicle of claim 1, wherein the implement-operating vehicle is under autonomous control.

10. The implement-operating vehicle of claim 1, wherein the implement-operating vehicle is under supervised autonomous control.

11. The implement-operating vehicle of claim 1, wherein the implement-operating vehicle is under manual control.

12. An implement-operating vehicle comprising:

a frame;

a plurality of ground engagement elements coupled to the frame;

a power source configured to power the ground engagement elements;

an implement platform coupled to the frame, wherein the implement platform comprises a rotation bearing, the implement platform configured to:

couple to a planter; and rotate the planter via the rotation bearing on an axis perpendicular to a ground surface;

a platform motor coupled to the rotation bearing providing a force to cause the planter to rotate at least 180 degrees; and one or more controllers communicatively coupled to the platform motor and the ground engagement elements, the one or more controllers including one or more processors configured to execute a set of program instructions stored in a memory, the set of program instructions configured to cause the one or more processors to:

control movement of the ground engagement elements along a ground surface in a first direction; and control operation of the platform motor to rotate the planter to a first position corresponding to the first direction, wherein the plurality of ground engagement elements comprises a set of forward drive ground engagement elements and a set of aft drive ground engagement elements, wherein the implement platform is coupled to the frame at a position between the set of forward drive ground engagement elements and the set of aft drive ground engagement elements, wherein the planter is restricted to a position between the set of forward drive ground engagement elements and the set of aft drive ground engagement elements such that rotating the planter 180 degrees does not cause the planter to contact any of the plurality of ground engagement elements.

13. The implement-operating vehicle of claim 12, wherein the planter is not operable when the implement platform is rotated to a second position not corresponding to the first direction.

14. The implement-operating vehicle of claim 12, further including a lift mechanism coupled to the implement platform configured to adjust a height of the planter relative to the ground surface.

15. The implement-operating vehicle of claim 12, further including a vision system communicatively connected to the one or more controllers, wherein the set of program instructions are further configured to cause the one or more processors to generate a virtual guide path based on data received from the vision system, wherein the virtual guide path includes at least one of:

a guide path segment that requires a steered movement to avoid an obstacle detected by the vision system, or a guide path segment that requires a steered movement to avoid a movement of the implement into a restricted area.

16. The implement-operating vehicle of claim 12, wherein the implement-operating vehicle is under autonomous, supervised autonomous, or manual control.

17. The implement-operating vehicle of claim 1, wherein the frame comprises a first longitudinal frame rail and a second longitudinal frame rail extending along a length of the implement-operating vehicle, wherein the implement platform is coupled to the first longitudinal frame rail and the second longitudinal frame rail.

18. The implement-operating vehicle of claim 12, wherein the frame comprises a first longitudinal frame rail and a second longitudinal frame rail extending along a length of the implement-operating vehicle, wherein the implement platform is coupled to the first longitudinal frame rail and the second longitudinal frame rail.

* * * * *